(12) United States Patent
Schirmer et al.

(10) Patent No.: US 9,383,001 B2
(45) Date of Patent: Jul. 5, 2016

(54) SHIFTING DEVICE

(75) Inventors: Heiko Schirmer, Regesbostel (DE); Wei Yang, Ruijin (CN)

(73) Assignee: ECS Engineered Control Systems AG, St. Gallen (CH)

( * ) Notice: Subject to any disclaimer, the term of this patent is extended or adjusted under 35 U.S.C. 154(b) by 129 days.

(21) Appl. No.: 14/241,249

(22) PCT Filed: Aug. 29, 2012

(86) PCT No.: PCT/EP2012/066774
§ 371 (c)(1),
(2), (4) Date: Feb. 26, 2014

(87) PCT Pub. No.: WO2013/030232
PCT Pub. Date: Mar. 7, 2013

(65) Prior Publication Data
US 2015/0013490 A1 Jan. 15, 2015

(30) Foreign Application Priority Data
Aug. 31, 2011 (DE) .......................... 10 2011 053 177

(51) Int. Cl.
*F16H 59/02* (2006.01)
*F16H 59/04* (2006.01)

(52) U.S. Cl.
CPC ........ *F16H 59/0278* (2013.01); *F16H 59/0204* (2013.01); *F16H 59/04* (2013.01); *F16H 2059/026* (2013.01); *Y10T 74/20159* (2015.01)

(58) Field of Classification Search
CPC ... F16H 59/0204; F16H 59/02; F16H 59/026; F16H 59/10; F16H 61/24
USPC ................. 74/473.1, 473.15, 473.18, 473.33, 74/473.34, 471 XY
See application file for complete search history.

(56) References Cited

U.S. PATENT DOCUMENTS 5,622,079 A * 4/1997 Woeste ............... F16H 59/0204
74/335
5,689,996 A * 11/1997 Ersoy .................. F16H 59/0204
74/335

(Continued)

FOREIGN PATENT DOCUMENTS

CN 101251183 A 8/2008
CN 101925760 A 12/2010

(Continued)

OTHER PUBLICATIONS

Int'l Search Report and Written Opinion issued Nov. 28, 2012 in Int'l Application No. PCT/EP2012/066774.
CN Search Report issued Feb. 27, 2015.
Int'l Preliminary Report on Patentability issued Mar. 13, 2014 in Int'l Application No. PCT/EP2012/066774.

*Primary Examiner* — Terence Boes
(74) *Attorney, Agent, or Firm* — Panitch Schwarze Belisario & Nadel LLP

(57) ABSTRACT

A shifting device for a transmission of a motor vehicle has an actuation lever (1) which can be selectively transferred into (a) a first selector gate, more particularly an automatic selector gate, in which the lever is mechanically coupled to a transmitting component (2) for actuating a gearshift cable or a gearshift linkage, or (b) a second selector gate, more particularly a sequential selector gate, in which the lever is decoupled from the transmitting component, the transmitting component being movably mounted, more particularly pivotably mounted. A locking means (11) can immobilize the transmitting component such that no force is exerted on the gearshift cable or the gearshift linkage as long as the actuation lever has been transferred into the second selector gate. The transmitting component may be released by a transfer of the actuation lever into the first selector gate.

19 Claims, 4 Drawing Sheets

(56) References Cited

U.S. PATENT DOCUMENTS

| | | | |
|---|---|---|---|
| 5,819,591 A | 10/1998 | Meyer | |
| 6,196,080 B1 | 3/2001 | Lee | |
| 7,114,410 B2 * | 10/2006 | Nagasawa | F16H 59/0204 74/471 XY |
| 2003/0029265 A1 * | 2/2003 | Wang | F16H 59/02 74/473.21 |
| 2004/0031346 A1 * | 2/2004 | Kahara | F16H 59/0204 74/473.18 |
| 2005/0139031 A1 | 6/2005 | Giefer et al. | |
| 2008/0072698 A1 * | 3/2008 | Hirano | F16H 59/0204 74/473.21 |

FOREIGN PATENT DOCUMENTS

| | | |
|---|---|---|
| DE | 19600526 A1 | 6/1996 |
| DE | 10222671 A1 | 12/2003 |
| DE | 19924238 B4 | 2/2005 |
| DE | 10252009 B4 | 3/2005 |
| DE | 102008022447 A1 | 11/2009 |
| EP | 1452782 A2 | 9/2004 |
| EP | 2261535 A1 | 12/2010 |
| JP | 2000-177422 A | 6/2000 |
| WO | 2009021509 A1 | 2/2009 |

* cited by examiner

SHIFTING DEVICE

CROSS-REFERENCE TO RELATED APPLICATIONS

This application is a national stage application (under 35 USC §371) of PCT/EP2012/066774, filed Aug. 29, 2012, which claims benefit of German application 10 2011 053177.7, filed Aug. 31, 2011.

BACKGROUND OF THE INVENTION

Technical Field and State of the Art

The invention relates to a shifting device for the transmission of a motor vehicle.

German patent DE 102 52 009 B4 discloses a shifting device for transmitting shifting commands to an automatic transmission. The shifting device has a shifting lever that is configured to pivot around a selection axis and around a shifting axis, whereby the selection axis and the shifting axis are arranged orthogonally relative to each other. The shifting lever can be shifted into at least a first shift gate or into a second shift gate, whereby the first shift gate selects the shifting positions (P, R, N and D) of an automatic transmission, and the second shift gate effectuates manual commands, whereby a shift carriage is provided that is mounted so that it can be moved linearly in a plane and that is configured in such a way that, through force coupling, the movement of the shifting lever in the first shift gate brings about a linear movement of the shift carriage and, through a movement of the shifting lever in the second shift gate, the movement of the shifting lever is uncoupled from the shift carriage. In order to secure the carriage, a locking element is arranged on the carriage and, in the locked state, this locking element engages with a housing and/or frame of the shifting device. The locking element is configured as a lever that has a hook and that engages with a recess at the end of the housing and/or frame.

German patent application DE 102 22 671 A1 describes a selector for a transmission. The selector has a lever that can be pivoted around a bearing point that is fixed relative to the vehicle, whereby a shifting finger and a locking finger are connected to the selector lever. The selector lever runs in a shift link that is arranged so as to be fixed relative to the vehicle and that has an automatic shift gate and an incremental shift gate. Individual shifting states in the automatic shift gate can be selected by moving a carriage. If the selector lever is in the incremental shift gate, then the carriage is blocked by the locking finger, as a result of which an unintentional selection of a shifting state of the automatic shift gate is prevented.

German patent document DE 10 2008 022 447 discloses a shifting device for an automatic transmission. The shifting device has a selector lever that can be moved in order to select several shifting positions in an automatic shift gate and in a manual shift gate and that can be moved in order to change between the automatic shift gate and the manual shift gate. A latching means is provided that associates stable latching positions with the shifting positions of the automatic shift gate as well as with the middle position of the manual shift gate, and the selector lever can be moved out of these stable latching positions against a spring force, and the selector lever is pre-tensioned into these stable latching positions by the spring force. This shifting device also has an actuation slide that is configured as a carriage and that is mounted so that it can be moved linearly. The actuation slide serves to actuate an actuation cable. Moreover, the shifting device is equipped with a locking element that, when a catch of the selector lever moves out of a catch seat of the actuation slide, engages positively with a recess formed on the actuation slide, thereby securing the actuation slide against displacing movements along its lengthwise extension. In order to bring about a retraction of the locking element into the recess when the catch extends out of the catch seat of the actuation slide, a compression spring is provided that pre-tensions the locking element in the direction of the actuation slide.

International patent application WO 2009/021509 A1 discloses an actuation means for transmitting shifting commands to the automatic transmission of a motor vehicle. The actuation means comprises a selector lever that can move in a shift gate between an automatic shift gate and a sequential shift gate, a shift carriage to relay the shifting commands to a gear transmitting element, a dividing means for dividing the force transmission between the selector lever and the shift carriage as well as an actuating operative means for blocking the selector lever in at least one selector lever position. The actuation means is characterized in that the locking means is configured to block the shift carriage, whereby the shift carriage, aside from the shift-lock positions, can also be locked in the position of the shift carriage that corresponds to the shift gate position of the selector lever.

European patent application EP 2 261 535 A1 discloses a shifting means for an automatic transmission installed in a vehicle. The transmission has a link plate with a main link and a secondary link formed in it. A shifting lever can be moved along the main link and the secondary link. A pivotable shifting member is provided in order to shift from one shifting mode to another. On the link plate, there is a latching projection that can engage with a locking groove of the shifting member in order to lock it. However, this type of lock is not very reliable; moreover, the shifting means gives the driver a jerky sensation.

A shifting device of the above-mentioned type better ensures that the transmitting component, especially after or during changing of the shift gate, functions reliably and is not fault-prone continues to be sought.

BRIEF SUMMARY OF THE INVENTION

A shifting device of the above-mentioned type has a locking means with which the transmitting component can be secured in such a way that it does not exert any force onto the gearshift cable or onto the gearshift linkage as long as the actuation lever has been moved into the second shift gate, and the locking means releases the transmitting component in that the actuation lever is moved into the first shift gate.

Here, the transmitting component is pivotably mounted in a shifting housing, wherein at least one centering means, especially a spring element, in particular a spring U-clamp, is provided, so that said centering means centers the transmitting component between opposite walls of the shifting housing, preferably flexibly. This yields an embodiment of the shifting device according to the invention that can be operated particularly smoothly and that is not fault-prone.

The transmitting component can be pivotably mounted. A pivot bearing can be implemented much more easily and cost-effectively than a linear bearing. Moreover, a pivot bearing is much more reliable and durable than a linear bearing. However, for special requirements, the transmitting component can also be arranged so as not to pivot but rather, for example, so as to be linearly movable.

In a special embodiment of a shifting device according to the invention, the transmitting component is configured so as to pivot and to actuate the gearshift cable or the gearshift linkage by means of the actuation lever.

In particular, for this purpose, it can advantageously be provided that the actuation lever has at least one projection that engages with a recess of the transmitting component when the actuation lever has been moved into the first shift gate and that is positioned outside of the recess when the actuation lever has been moved into the second shift gate. In addition or as an alternative, it can also be provided that the transmitting component has at least one projection that engages with a recess of the actuation lever when the actuation lever has been moved into the first shift gate and that is positioned outside of the recess when the actuation lever has been moved into the second shift gate.

In a special embodiment, in order to select one of several shifting positions, especially one of the shifting positions P, R, N, D in the first shift gate, the actuation lever can be pivoted around a first pivot axis. In addition or as an alternative, it can be provided that the actuation lever can be pivoted in the second shift gate around a second pivot axis that is especially parallel and/or coaxial to the first pivot axis—especially in order to select "+" to upshift or in order to select "−" to downshift.

For purposes of moving from one shift gate to the other shift gate, the actuation lever is advantageously pivotable around an axis of movement that is arranged perpendicular to a plane in which the first pivot axis and/or the second pivot axis is arranged. In addition or as an alternative, it can be provided that, in order to move from one shift gate to the other shift gate, the actuation lever is pivotable around an axis of movement that is arranged skewed relative to the first pivot axis and/or to the second pivot axis.

In an advantageous embodiment, the transmitting component and the actuation lever—at least when the actuation lever has been moved into the first shift gate—are mounted pivotably around the same pivot axis. In addition or as an alternative, it can be provided that the transmitting component and the actuation lever—at least when the actuation lever has been moved into the first shift gate—are mounted pivotably around pivot axes that are parallel to each other.

In an especially advantageous embodiment, it is provided that the pivot bearing of the transmitting component additionally functions as a pivot bearing for the actuation lever, at least when the latter has been moved into the first shift gate.

An embodiment that is especially easy and cost-effective to produce is one in which the transmitting component has a first pivot arm and a second pivot arm. Moreover, a particularly reliable and sturdy embodiment is one in which the transmitting component has a first pivot arm and a second pivot arm, whereby the actuation lever is arranged between the first pivot arm and the second pivot arm. This embodiment ensures a symmetrical transmission of force and/or torque—at least when the actuation lever has been moved into the first shift gate—so that the risk of tilting or tipping is largely ruled out.

In particular, it can be advantageous for the transmitting component to have a first pivot arm and a second pivot arm that are firmly connected to each other by means of a connecting part. Such a solution especially permits an implementation of the above-mentioned advantageous embodiments in a sturdy and cost-effective manner.

In an embodiment that can be operated particularly smoothly and that is not fault-prone, the transmitting component is pivotably mounted relative to at least one wall of a shifting housing and it can be moved relative to the at least one wall against the force of at least one spring element. In addition or as an alternative, it can advantageously be provided that the transmitting component is pivotably mounted in a shifting housing, whereby a centering means, especially a spring element, in particular a spring U-clamp, is provided, whereby said centering means centers the transmitting component between opposite walls of the shifting housing, preferably flexibly.

In a special embodiment, the locking means has a spring element or is configured as a spring element. In particular, it can be provided that the locking means secures the transmitting component in such a way that it does not exert any force on the gearshift cable or on the gearshift linkage as long as the actuation lever has been moved into the second shift gate, and the locking means releases the transmitting component when the actuation lever has been moved into the first shift gate.

In a special embodiment, it is provided that the actuation lever operates the locking means.

In particular, it can also be provided that the locking means can be moved with the actuation lever out of a released position in which the transmitting component is movable, especially pivotable, into a locked position in which the locking means blocks the transmitting component in such a way that it is not movable, especially not pivotable, and/or it can also be provided that the locking means can be moved with the actuation lever out of a locked position in which the locking means blocks the transmitting component in such a way that it is not movable, especially not pivotable, into a released position in which the transmitting component is movable, especially pivotable.

In particular, the spring element can advantageously be configured as a spring tab—at least partially.

In an advantageous, simple and thus very reliable embodiment, the actuation lever has an actuation projection that holds the locking means—preferably against a pre-tension generated thereby—in a released position in which the transmitting component can be pivoted when the actuation lever has been moved into the first shift gate.

Moreover, it can be provided that the actuation projection moves away from the locking means and/or yields to a pre-tension of the locking means in order to permit a locking movement of the locking means. Moreover, it can advantageously be provided that the actuation projection moves into the released position when the actuation lever is moved from the first shift gate into the second shift gate.

In an advantageous manner, the locking means, especially at least one end of the locking means, can be attached to the transmitting component.

In particular, it can advantageously be provided that the locking means is arranged—for example, with one end—on the transmitting component and engages—for the locking means does not engage with the locking receptacle when the actuation lever has been moved into the first shift gate.

Of course, conversely, it can also be provided that the locking means is arranged on a shifting frame or shifting housing that is stationary relative to the motor vehicle and that the locking means engages with a locking receptacle of the transmitting component when the actuation lever has been moved into the second shift gate, and the locking means does not engage with the locking receptacle when the actuation lever has been moved into the first shift gate.

In an advantageous embodiment, it is provided that one end of the locking means is firmly positioned on the transmitting component, whereas an opposite end of the locking means is intended to engage with a locking receptacle of a shifting frame or shifting housing. Of course, conversely, it can also be provided that one end of the locking means is firmly positioned on the shifting frame or shifting housing, whereas an opposite end of the locking means is intended to engage with a locking receptacle of the transmitting component.

In an especially advantageous embodiment, the pivoting capability of the transmitting component is blocked when the actuation lever has been moved into the second shift gate, and the pivoting capability of the transmitting component is released when the actuation lever has been moved into the first shift gate.

A gearshift cable or a gearshift linkage can advantageously be attached to the transmitting component in order to mechanically transmit shifting commands. For example, the transmitting component can have a coupling point for a gearshift cable or for a gearshift linkage.

It is especially advantageous to have a transmission, especially an automatic transmission, for a motor vehicle and/or for a motor vehicle that is equipped with a shifting device according to the invention.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims to which they refer back.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

The following is shown.

DETAILED DESCRIPTION OF THE INVENTION

Detailed Description of Embodiments

Figure 1:
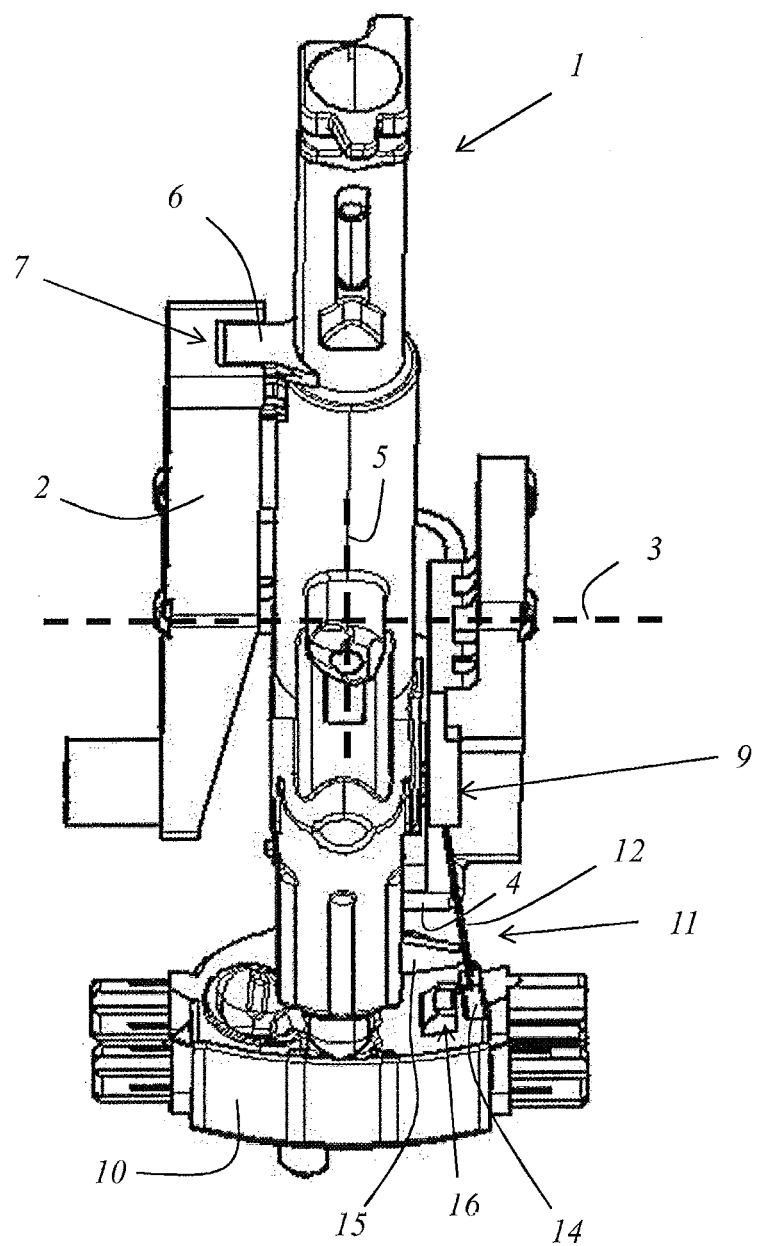
FIG. 1 a detailed view of a shifting device according to the invention, in which the actuation lever has been moved into a first shift gate, FIG. 2 a detailed view of a shifting device according to the invention, in which the actuation lever has been moved into a second shift gate, FIG. 3 a detailed view of a transmitting component of a shifting device according to the invention, and FIG. 4 another detailed view of the transmitting component.

FIG. 1 shows a detailed view of a shifting device according to the invention for the transmission of a motor vehicle. The shifting device has an actuation lever 1 that can be moved either into a first shift gate, especially an automatic shift gate, for example, in order to select one of the shifting positions P, R, N, D or else into a second shift gate, especially in order to select "+" to upshift or in order to select "—" to downshift.

In the detailed view shown in FIG. 1, the actuation lever 1 is in the first shift gate. In this position, the actuation lever 1 is mechanically coupled to a transmitting component 2. This is done in such a way that the transmitting component 2 can be pivoted with the actuation lever to actuate a gearshift cable or a gearshift linkage (not visible here). Pivoting in order to select one of several shifting positions in the first shift gate takes place by pivoting the actuation lever 1—and thus also the transmitting component 2—in a plane that is perpendicular to the plane of the drawing, namely, by pivoting around a pivot axis 3. The transmitting component 2 has a coupling nose 4 for coupling a gearshift cable, whereby this coupling nose 4 can only be seen partially in this figure. The coupling nose can be seen clearly in FIG. 3.

In order to move the actuation lever 1 into the second shift gate, it is pivoted around an axis of movement 5. The axis of movement 5 is arranged perpendicular to a plane in which the pivot axis 3 is located. Moreover, the axis of movement 5 is arranged above the pivot axis 3 as seen from the view of the operator of the actuation lever 1.

The actuation lever has a first projection 6 that engages with a first recess 7 of the transmitting component 2 when the actuation lever 1 is in the first shift gate. Moreover, the actuation lever 1 has a second projection 8 that engages with a second recess 9 of the transmitting component 2 when the actuation lever 1 has been moved into the first shift gate. This ensures that the transmitting component can be pivoted by means of the actuation lever in order to actuate the gearshift cable or a gearshift linkage. The actuation lever 1 and the transmitting component 2—when the actuation lever is in the first shift gate—are mounted so as to pivot jointly around the same pivot axis 3. When the actuation lever 1 is moved into the second shift gate, the transmitting component 2 is secured relative to a shifting frame 10 (of which only part can be seen here)—preferably stationary relative to the motor vehicle—by means of a special locking means 11, as a result of which the pivoting capability is eliminated. When the actuation lever 1 is in the second shift gate, however, it can still be pivoted around the pivot axis 3, especially for purposes of manually upshifting or downshifting.

The locking means 11 is configured as a spring element 12, namely, as a spring tab. A first end 13 of the locking means 11 is firmly connected to the transmitting component 2. The opposite second end 14 of the locking means 11 ends freely and is held in a released position by means of an actuation projection 15 of the actuation lever 1 against a pre-tension generated by the spring element 12.

Once the actuation lever 1 has been moved into the second shift gate, the actuation projection 15 moves away from the locking means 11 in such a way that the second end 14 of the locking means can engage with a locking receptacle 16 of the shifting frame 10. In this manner, the pivoting capability of the transmitting component 2 around the pivot axis 3 is blocked. This is shown in FIG. 2.

Figure 2:
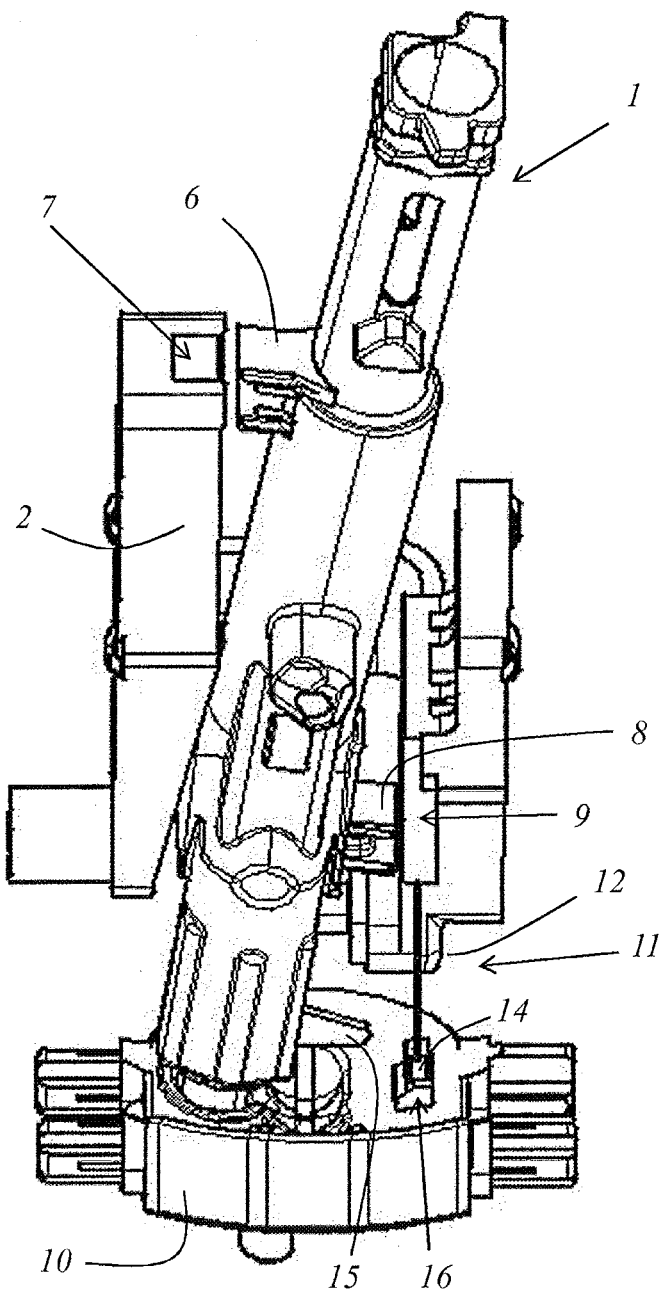

FIG. 2 also clearly shows that the first projection 6 and the second projection 8 are disengaged with respect to the recesses 7 and 9 when the actuation lever 1 has been moved into the second shift gate. This means that the actuation lever 1—even though the transmitting component 2 is secured by means of the locking means 11—can be pivoted around the pivot axis 3 for purposes of upshifting or downshifting.

When the actuation lever 1 is moved from the second shift gate back into the first shift gate, the actuation projection 15 pushes the locking means 11 out of the locking receptacle 16. At the same time, the projections 6 and 8 of the actuation lever 1 engage with the associated recesses 7 and 9 of the transmitting component 2 so that the gearshift cable or the gearshift linkage can once again be actuated by means of the actuation lever 1.

Figure 3:
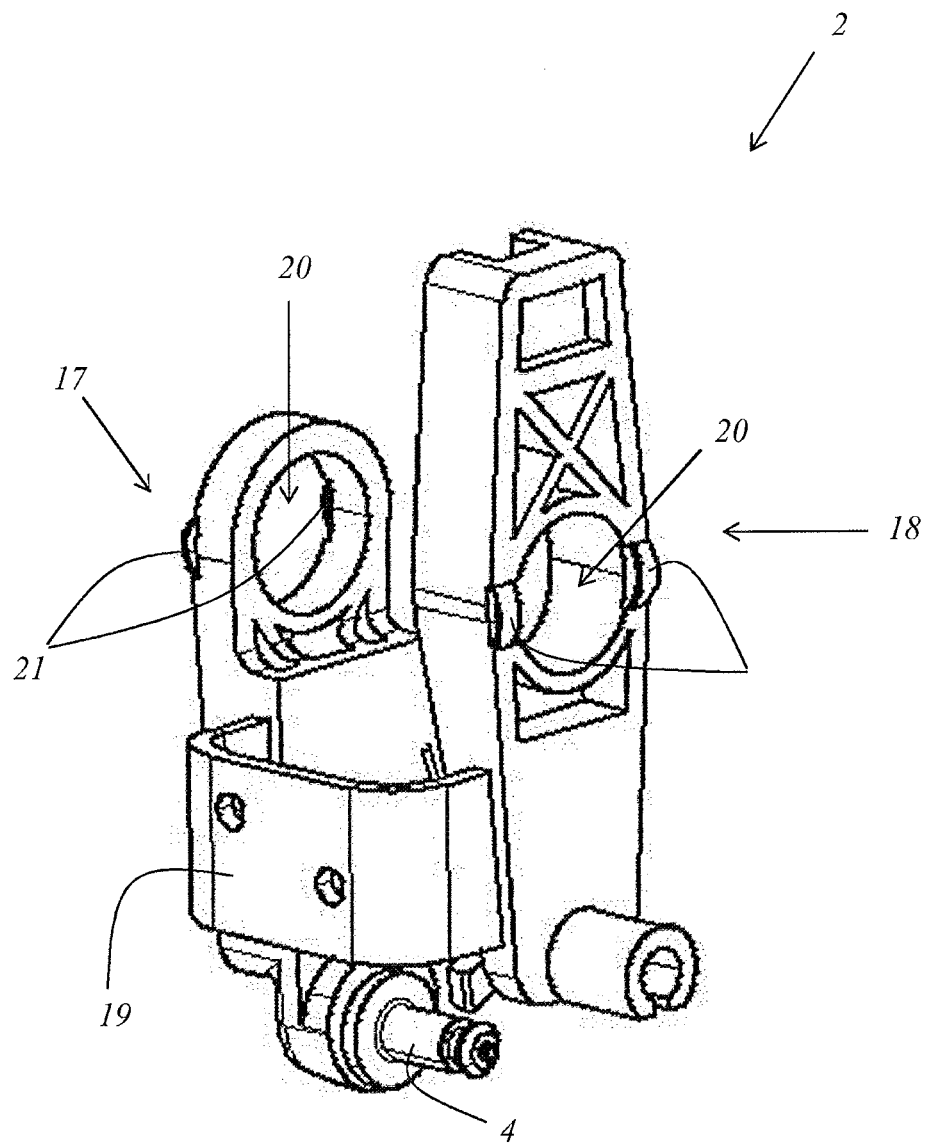

FIG. 3 shows the transmitting component 2. It is made up of several parts and it has a first pivot arm 17 as well as a second pivot arm 18, whereby the first pivot arm 17 and the second pivot arm 18 are firmly connected to each other by means of a U-clamp 19. The pivot arms 17 and 18 each have an opening 20 for the pivotable bearing of the transmitting component 2.

The lower end of the first pivot arm 17 has a coupling site 4 for attaching a gearshift cable or a gearshift linkage.

The pivot arms 17 and 18 each have spring U-clamps 21 on a side facing outwards in the area of the openings 20, and these spring U-clamps make it possible to arrange the transmitting component 2 so that it can pivot between two walls of a shifting frame or shifting housing in such a way that none of the spring arms drag against the insides of the shifting frame or shifting housing. Rather, the spring U-clamps 21 form centering means that center the transmitting component 2 between opposite walls of the shifting housing or of a shifting frame in such a way that only the spring U-clamps touch the walls.

Figure 4:
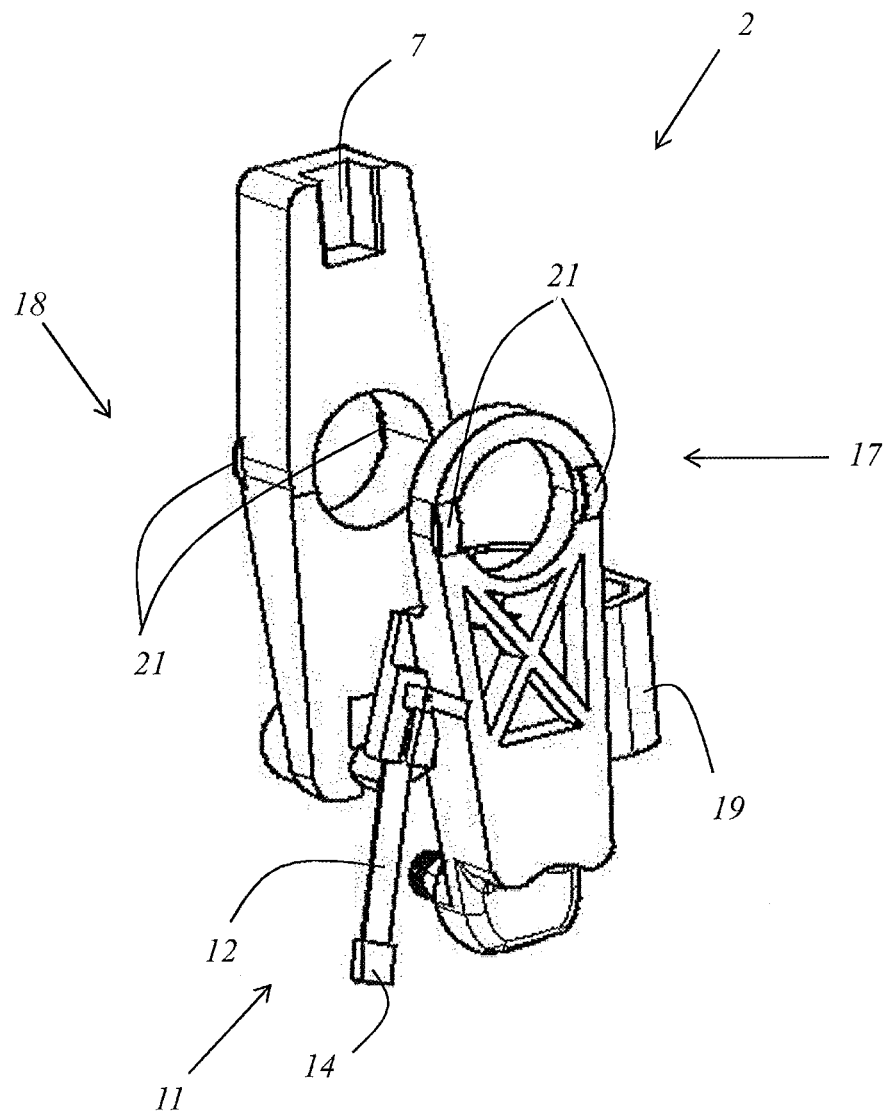

FIG. 4 shows the transmitting component 2 to which the locking means 11 configured as a spring tab is attached.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A shifting device for the transmission of a motor vehicle, comprising:
an actuation lever (1) selectively movable into either (a) a first automatic shift gate in which said lever is mechanically coupled to a transmitting component (2) for actuating a gearshift cable or a gearshift linkage, or (b) a second sequential shift gate in which the lever is uncoupled from the transmitting component (2), wherein the transmitting component (2) is movably mounted; and a locking means (11) adapted to secure the transmitting component (2) without exerting any force onto the gearshift cable or onto the gearshift linkage as long as the actuation lever (1) has been moved into the second shift gate, and adapted to release the transmitting component (2) when the actuation lever (1) is moved into the first shift gate,
wherein the transmitting component (2) is pivotably mounted in a shifting housing arranged in a fixed position in a motor vehicle, and
wherein at least one centering means comprising a spring element or spring U-clamp in sliding engagement with the shifting housing, the centering means centering the transmitting component (2) between opposite walls of the shifting housing.

2. The shifting device according to claim 1, characterized in that the actuation lever operates the locking means.

3. The shifting device according to claim 1, wherein
a. the locking means is movable with the actuation lever out of a released position in which the transmitting component (2) is movable or pivotable into a locked position in which the locking means blocks the transmitting component (2) in such a way that it is not movable or pivotable; or
b. the locking means is movable with the actuation lever out of a locked position in which the locking means blocks the transmitting component (2) in such a way that it is not movable, or pivotable, into a released position in which the transmitting component (2) is movable or, pivotable.

4. The shifting device according to claim 1, wherein the locking means has a spring element or a spring element that is configured as a spring tab (12).

5. The shifting device according to claim 1 wherein the actuation lever (1) has an actuation projection (15) that holds the locking means (11)—in a released position in which the transmitting component (2) is movable when the actuation lever (1) has been moved into the first shift gate.

6. The shifting device according to claim 1 wherein
a. the locking means (11) is arranged on the transmitting component (2) and engages with a locking receptacle (16) of a shifting frame (10) or shifting housing when the actuation lever (1) has been moved into the second shift gate, and the locking means (11) does not engage with the locking receptacle (16) when the actuation lever (1) has been moved into the first shift gate, or
b. the locking means (11) is arranged on a shifting frame (10) or shifting housing and engages with a locking receptacle (16) of the transmitting component (2) when the actuation lever (1) has been moved into the second shift gate, and the locking means (11) does not engage with the locking receptacle (16) when the actuation lever (1) has been moved into the first shift gate.

7. The shifting device according to claim 1, wherein
a. one end (13) of the locking means (11) is firmly positioned on the transmitting component (2), whereas an opposite end (14) of the locking means (11) is engageable with a locking receptacle (16) of a shifting frame (10) or shifting housing that is or can be arranged in a fixed position in a motor vehicle, or
b. one end (13) of the locking means (11) is firmly positioned on the shifting frame (10) or shifting housing that is or can be arranged in a fixed position in a motor vehicle, whereas an opposite end (14) of the locking means (11) is engageable with a locking receptacle (16) of the transmitting component (2).

8. The shifting device according to claim 1, wherein
a. the transmitting component (2) for actuating the gearshift cable or the gearshift linkage is arranged so that it can be pivoted by means of the actuation lever (1), or
b. the transmitting component (2) for actuating the gearshift cable or the gearshift linkage is arranged so that it can be moved linearly by means of the actuation lever (1).

9. The shifting device according to claim 1 wherein in order to select one of several shifting positions such as P, R, N, D in the first shift gate, the actuation lever (1) is pivotable in the first shift gate around a first pivot axis (3), or in the second shift gate in order to select "+" to upshift or in order to select "−" to downshift—around a second pivot axis (3) that is parallel and/or coaxial to the first pivot axis (3).

10. The shifting device according to claim 9, characterized in that,
a. in order to move from one shift gate to the other shift gate, the actuation lever (1) is pivotable around an axis of movement (5) that is arranged perpendicular to a plane in which the first pivot axis (3) and/or the second pivot axis (3) is arranged, or
b. in order to move from one shift gate to the other shift gate, the actuation lever (1) is pivotable around an axis of movement (5) that is arranged perpendicular to a plane in which the first pivot axis (3) and/or the second pivot axis (3) is arranged, whereby the actuation lever operates the locking means when it is pivoted around the axis of movement (5), or
c. in order to move from one shift gate to the other shift gate, the actuation lever (1) is pivotable around an axis of movement (5) that is arranged skewed relative to the first pivot axis (3) and/or to the second pivot axis (3).

11. The shifting device according to claim 1 wherein
the actuation lever (1) has at least one projection (6) that engages with a recess (9) of the transmitting component (2) when the actuation lever (1) has been moved into the first shift gate and that is positioned outside of the recess (9) when the actuation lever has been moved into the second shift gate.

12. The shifting device according to claim 1 wherein the transmitting component (2) and the actuation lever (1)—at least when the actuation lever (1) has been moved into the first shift gate—are mounted pivotably around the same pivot axis (3) or around pivot axes (3) that are parallel to each other.

13. The shifting device according to claim 1 wherein a pivot bearing of the transmitting component (2) additionally functions as a pivot bearing for the actuation lever (1), at least when the actuation lever (1) has been moved into the first shift gate.

14. The shifting device according to claim 1 wherein the transmitting component (2) has a first pivot arm (17) and a second pivot arm (18), and wherein the actuation lever (1) is arranged between the first pivot arm (17) and the second pivot arm (18).

15. The shifting device according to claim 1 wherein the transmitting component (2) is pivotably mounted relative to at least one wall of a shifting housing arranged in a fixed position in a motor vehicle and is movable against the force of at least one spring element relative to the at least one wall.

16. The shifting device according to claim 1 wherein the transmitting component (2) is blocked from moving or pivoting when the actuation lever (1) has been moved into the second shift gate, and the transmitting component (2) is movable or pivotable when the actuation lever (1) has been moved into the first shift gate.

17. The shifting device according to claim 1 wherein a gearshift cable or a gearshift linkage is attached to the transmitting component (2).

18. A motor vehicle with a shifting device according to claim 1.

19. The shifting device according to claim 1, wherein the transmitting component (2) has a first pivot arm (17) and a second pivot arm (18) that are firmly connected to each other by means of a connecting part.

\* \* \* \* \*